UNITED STATES PATENT OFFICE.

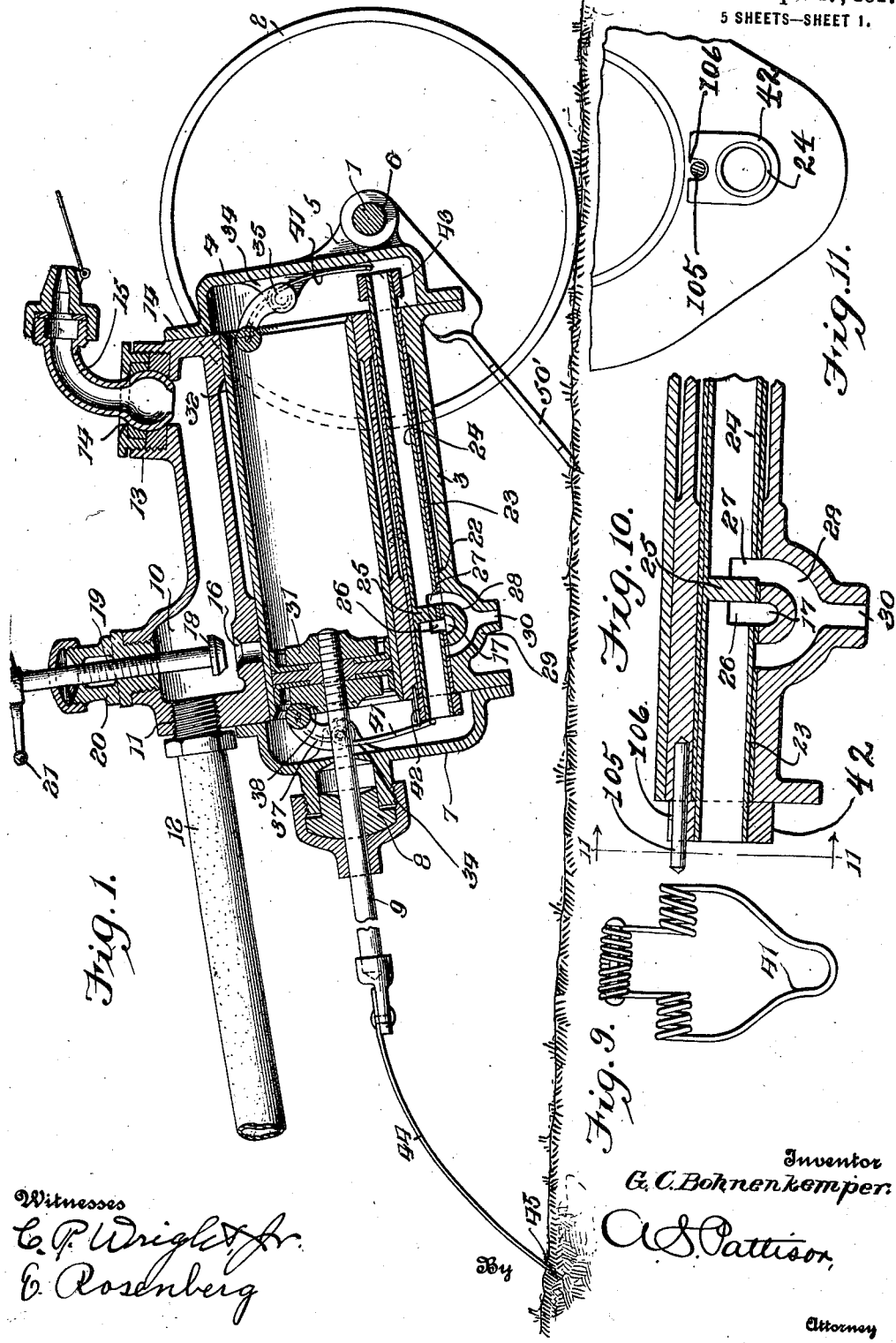

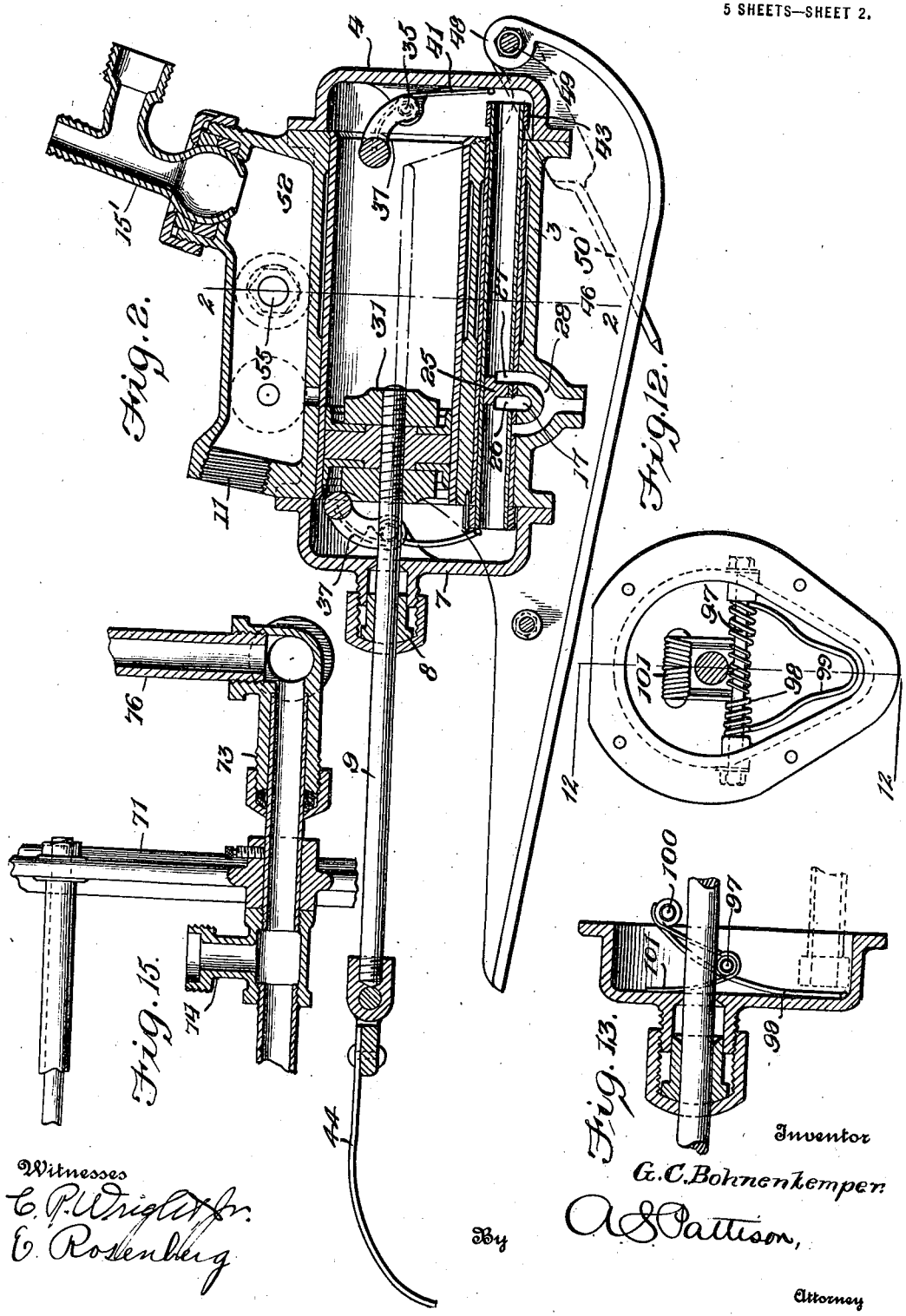

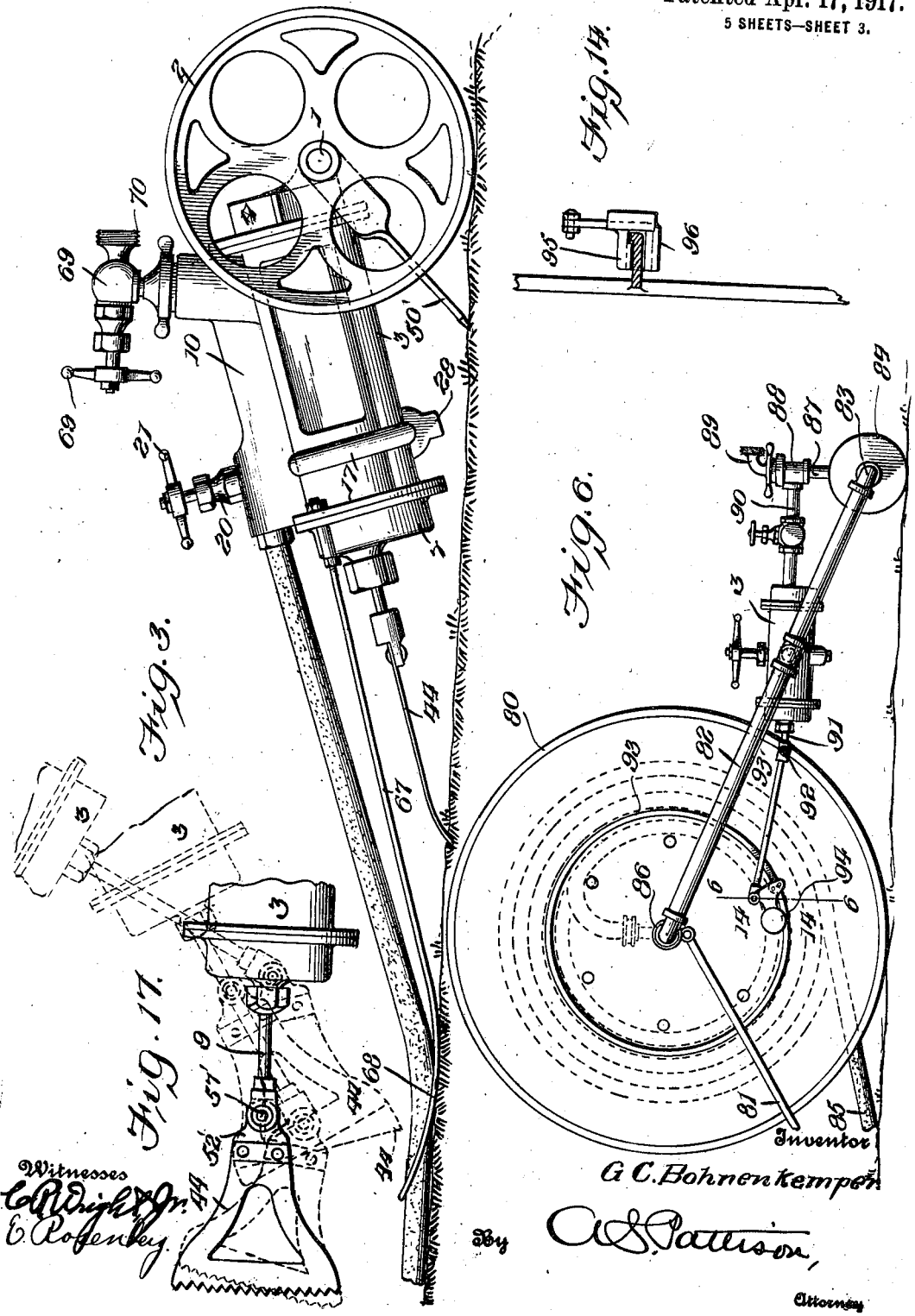

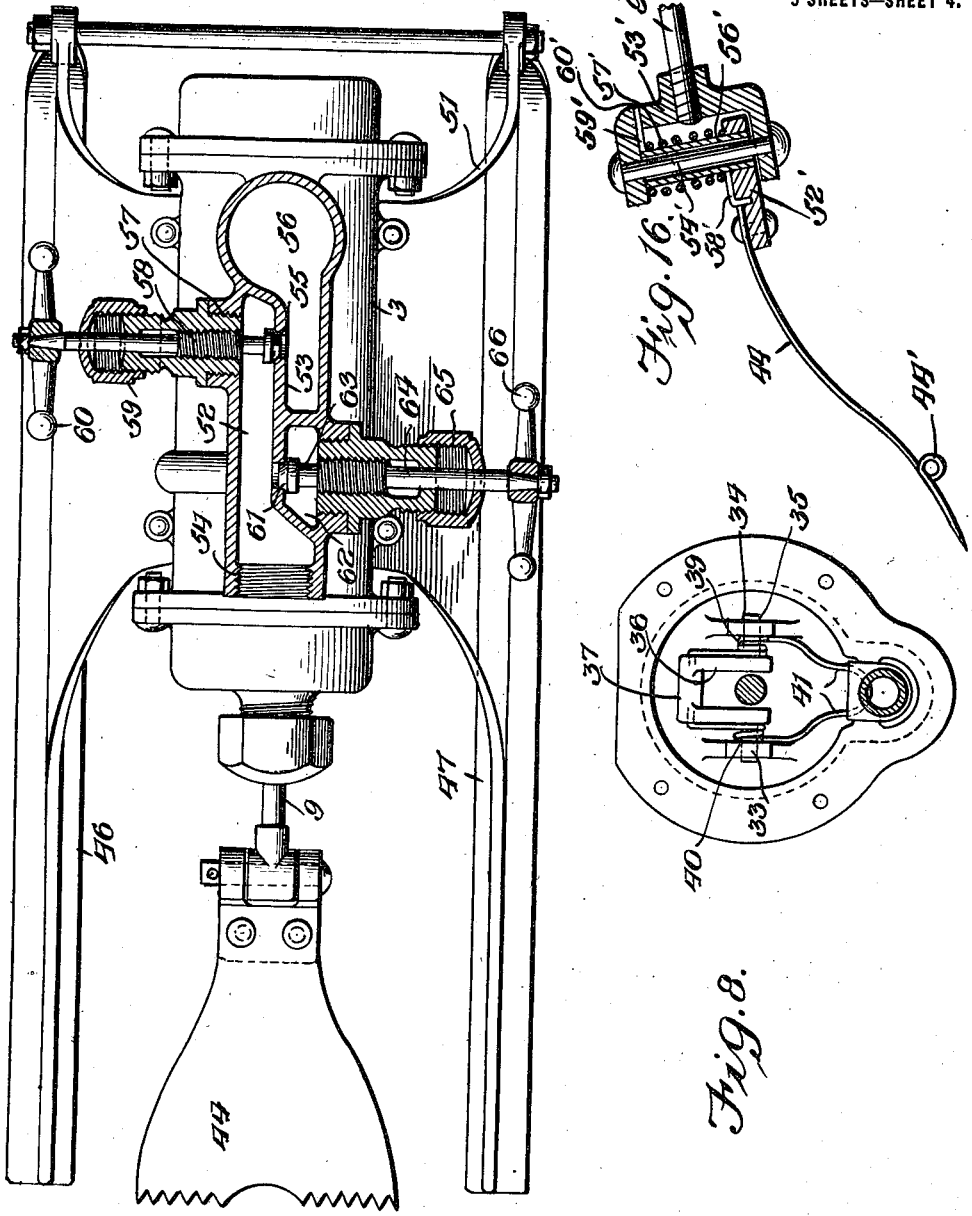

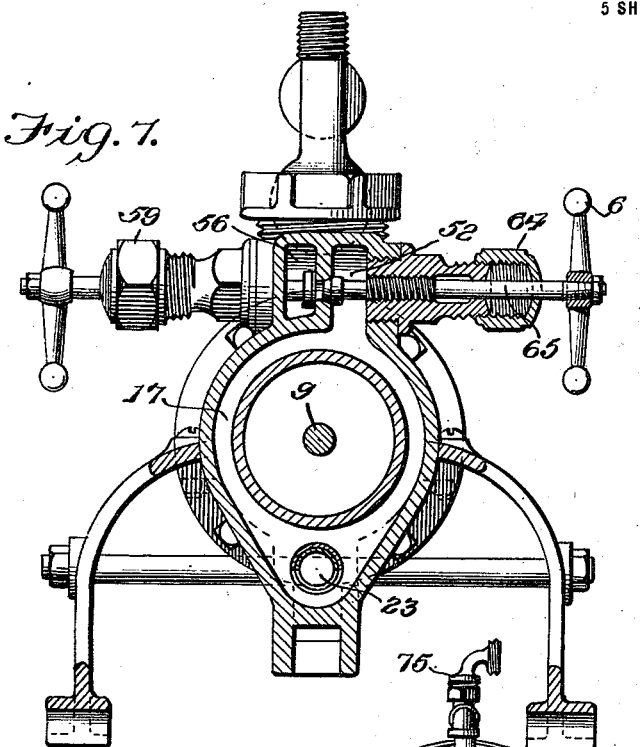
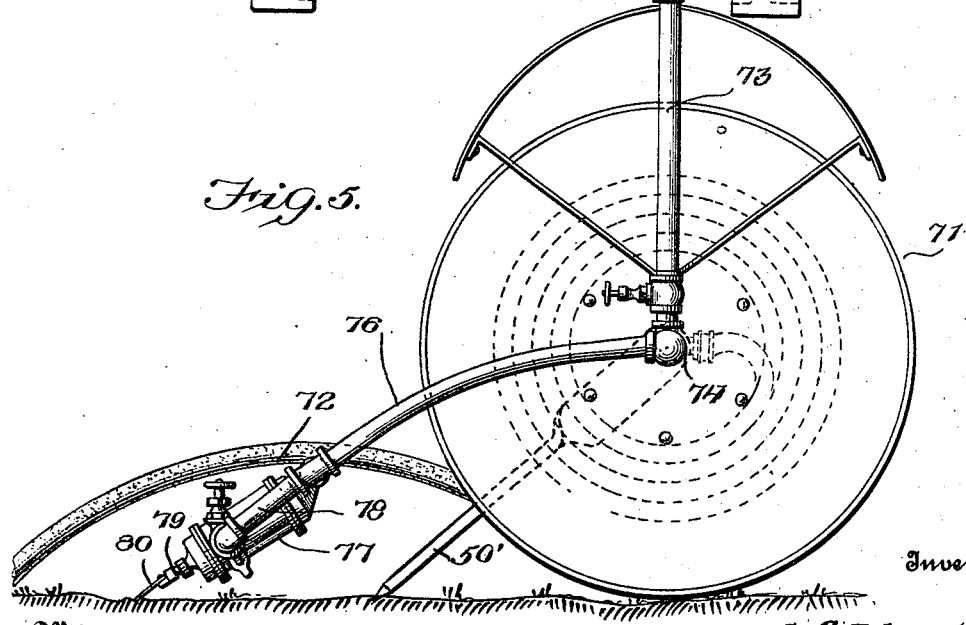

GEORGE CHARLES BOHNENKEMPER, OF DENVER, COLORADO.

LAWN-SPRINKLER.

1,223,246.  Specification of Letters Patent.  Patented Apr. 17, 1917.

Application filed August 18, 1914. Serial No. 857,365.

*To all whom it may concern:*

Be it known that I, GEORGE C. BOHNENKEMPER, a citizen of the United States, residing at Denver, in the county of Denver and State of Colorado, have invented certain new and useful Improvements in Lawn-Sprinklers, of which the following is a specification, reference being had therein to the accompanying drawing.

My invention relates to an improved lawn sprinkler.

The object of my invention is to provide a lawn sprinkler in which the hose can be readily attached and which will travel along the ground under its own power, using the water pressure in the hose from the supply mains as a motive force and in this way automatically shift its position along the ground thereby irrigating the lawn much more evenly and at the same time with a great saving of water.

Another object of my invention is to provide a lawn sprinkler of this character which requires very little attention, thus saving the labor in the sprinkling of the lawn and at the same time providing a simple, cheap and effective device having certain details of structure and operation hereinafter more fully set forth.

In the accompanying drawings:

Figure 1 is a vertical sectional view of my improved sprinkler showing the cylinder and piston in section, whereby the sprinkler is caused to move over the lawn.

Fig. 2 is a vertical longitudinal sectional view similar to Fig. 1, and showing the sprinkler mounted upon runners instead of wheels, as shown in Fig. 1.

Fig. 3 is a side elevation of Fig. 1, showing the cylinder supplied with a supporting shoe, whereby the rear end of the sprinkler is not wholly supported by the piston as that shown in Fig. 1.

Fig. 4 is a top plan view of Fig. 2.

Fig. 5 is a side elevation of a modified form of a sprinkler showing the hose mounted upon a reel and the reel driven by the water-pressure in the manner similar to that shown in Figs. 1 and 2.

Fig. 6 is a side elevation of a still further modified form showing a reel and in which the operating piston operates directly upon the reel for rolling it across the lawn instead of operating upon the ground as shown in other forms.

Fig. 7 is a transverse vertical sectional view taken on the line 2—2 of Fig. 2.

Fig. 8 is an end view of the cylinder-head showing the valve operating mechanism.

Fig. 9 is a plan view of a modified form of the valve operating mechanism.

Fig. 10 is an enlarged vertical longitudinal sectional view of the reversing valve.

Fig. 11 is an end view of Fig. 10.

Fig. 12 is an end view of the cylinder-head showing the form of valve operating lever and mechanism shown in Fig. 9.

Fig. 13 is an enlarged sectional view of the cylinder-head taken on the line 12—12 of Fig. 12.

Fig. 14 is an enlarged sectional view taken on the line 6—6 of Fig. 6.

Fig. 15 is a horizontal sectional view of Fig. 5.

Fig. 16 is an enlarged side elevation partly in section of my improved foot.

Fig. 17 is a diagrammatical view showing the several positions, in dotted lines, that the foot would assume.

In the ordinary type of lawn sprinklers, it is necessary to move the same by hand from place to place, which requires a great amount of time and almost constant attention in order to properly sprinkle the lawn, and if careful attention is not given to the sprinkler, some parts of the lawn will be flooded and a vast amount of water wasted, while other parts are overlooked or receive an insufficient supply of water.

With my invention the sprinkler is started at any desired point and the water-pressure from the hose sets the motor in action and the sprinkler will travel slowly at intervals across the lawn and evenly water the same until it has covered the desired distance, when it is turned and started back or in another direction. By regulating the flow of water to the hose the speed of the motor is given and, therefore, the speed of travel of the sprinkler across the lawn can be readily governed.

Referring now, to the drawings, 1 represents an axle upon the outer ends of which are mounted the wheels 2 for supporting the sprinkler. These wheels 2 are placed any desired distance apart according to the size of the sprinkler and loosely mounted upon the axle 1, between the wheels, is the forward end of the cylinder 3. The cylinder 3 is of an elongated form and provided with a forward removable cylinder-head 4, secured to the cylinder in any desired manner and having the ears 5 provided with openings through which the axle passes and by means of which the cylinder 3 is loosely mounted upon the axle to oscillate, the purpose of which will be later described. The rear end of the cylinder likewise has a removable cylinder-head 7, provided with a stuffing-box 8, through which the piston rod 9 passes and by means of which a water-tight joint is formed with the piston rod. The upper end of the cylinder 3, is provided with a longitudinal passage 10, having at its rear end a screw-threaded opening 11, into which is screwed the hose 12. The forward end of the passage 10 has a nipple 13 in which is mounted the ball 14 of the sprinkling nozzle 15. By this arrangement it will be seen that the nozzle 15 can be set to sprinkle on either side of the sprinkler or forward as desired. The nozzle 15 is of the splash-form, but it will be understood that any desired form of sprinkling nozzle can be used without departing from my invention. The water thus passes from the hose 12 through the passage 10 and out through the nozzle 15, as clearly shown in Fig. 1 of the drawings.

The passage 10 has an opening 16 adjacent its rear end, which communicates with an annular passage 17 in the cylinder 3, said annular passage extending entirely around the cylinder. The opening 16 is controlled by a valve 18 having a valve-stem 19, passing outwardly through a stuffing box 20 and operated by a hand-wheel 21. By this arrangement it will be seen that the passage of the water from the passage 10 to the annular passage 17 is controlled by the valve, whereby the movement of the sprinkler is governed, as will be hereinafter more fully described.

The lower end of the cylinder 3 is provided with a longitudinally extending passage 22, in which is mounted a sleeve or bushing 23. Slidably mounted in the bushing 23, is a valve 24. This bushing 23 is made removable so that it can be removed and replaced when it becomes worn and thus the valve requires no packing as any amount of leakage that might take place would not interfere with the operation of the device and the exhaust or leakage is discharged upon the ground and aids in sprinkling the lawn. The valve 24 is of a length greater than that of the cylinder 3, and extends outwardly into the hollow cylinder heads 4 and 7, as clearly shown in Fig. 1 of the drawing. As heretofore stated, the valve 24 is of a hollow form and adjacent its rear end is provided with a partition 25, and on the respective sides of the partition 25 are openings 26 and 27, communicating with a semi-circular passage 28 in the housing 29 formed on the lower face of the cylinder around the annular passage 17. Communicating with the semi-circular passage 28 is an opening 30, through which the exhaust from the cylinder passes, as will be later described.

The piston rod 9, is provided with a piston 31, which is preferably that of the form shown in Fig. 1, but could be made of any form without departing from my invention. This piston 31 closely fits a removable sleeve 32, secured within the cylinder, and while I have shown this removable sleeve, it will be understood that this is not absolutely necessary as the piston 31 could directly engage the inner face of the cylinder 3. The cylinder heads 4 and 7 are provided with ears 33 and 34, in which are mounted the trunnions 35 of the yoke 36. The yoke 36 is provided with the rounded upper end 37 adapted to engage the curved faces 38 of the piston 31 and whereby the yokes are rocked by engagement with the piston. Surrounding the trunnions 35 of the yoke are coiled springs 39 and 40, which have their upper ends secured to the yokes and their lower ends formed into a loop 41, which engages the outer end of the valve 24. The springs 39 and 40 normally hold the yoke 36 in the inward position shown in Fig. 1, and the loop 41 is normally held in engagement with the cylinder head.

The valve 24 at each end has secured thereon the nuts 42 and 43, which are within the cylinder-heads 4 and 7, and the valve 24 is of a length greater than that of the cylinder so that the partition may be brought into the position to cause the passage 17 to communicate with one end of the piston on one side of the partition 25, and vice versa so that the water-pressure from the hose 12 is supplied to either end of the cylinder.

In operation the water, as shown in Fig. 1, passes from the passage 10 through the opening 16 to the annular passage 17, and thence out through the hollow valve to the left-hand or rear end of the piston, as fully shown in Fig. 1 of the drawing. This water-pressure causes the piston 31 to move forward within the cylinder and when it has reached the end of the cylinder, it engages the rounded upper end 37 of the yoke 36, which forces the same upwardly within the cylinder head 4 and the looped end 41 engages the end of the valve 24. The valve is held against the tension of the spring by the water pressure on the partition 25 and will not start to move until the pressure of the spring is greater than the water pressure. This forces the valve to the left, so as to bring the partition 25 on the opposite side of the annular passage 17, which allows the water to pass to the forward end of the cylinder. This movement of the valve 24 also brings the opening 26 opposite the passage 28, so that the water in the cylinder to the left of the piston 31 may be exhausted through the said passage 28 and out through the opening 30 to the ground. By this structure it will be seen that the water continuously reciprocates the piston and the rear end of the piston-rod which is provided with an enlarged downwardly curved foot 44, provided at its lower end with teeth 45, which engage the ground and as the piston reciprocates, as heretofore described, the device is rolled forward the length of the stroke of the piston. By operating the valve 18 through the medium of the stem 19 and the hand-wheel 21, the pressure of the water to the annular passage 17 may be regulated, whereby the rapidity of the reciprocation of the piston is regulated so as to cause the sprinkler to move more rapidly or slower across the lawn.

In the modification shown in Fig. 2, of the drawings, instead of mounting the cylinder upon wheels, as described and shown in Fig. 1, I have mounted it upon runners 46 and 47. These runners are provided at their forward ends with ears 48, between which extends the shaft 49. upon which are mounted the forwardly extending arms 51, carried by the cylinder 3. In this form of cylinder, the piston and the valve operating mechanism and annular supply passage 17 are all arranged and operated in the same manner as that shown in Fig. 1, and the same reference numerals in this figure indicate like parts.

In the modification shown in Fig. 2 the water-passage at the upper end of the cylinder is arranged differently and is provided with two valves, whereby the water-pressure to the cylinder is regulated and also the water-pressure and discharge therefrom to the nozzle is regulated. In this form the passage 52 is provided with the vertical partition 53, which has its rear end open and screw-threaded, as indicated at 54, and whereby the hose is attached thereto. The forward end of the partition 53 is provided with an opening 55, through which passes the water from the passage 52 to the passage 56, said passage 56 having the nozzle 15' connected thereto in the same manner as that shown in Fig. 1. This opening 55 is closed by a valve 57 having the valve-stem 58 passing outwardly through a stuffing-box 59 carrying a hand-wheel 60, by means of which the valve-stem is operated, whereby the passage of water through the opening 55 is limited. By this arrangement it will be seen that the water discharge from the nozzle may be readily regulated. The rear end of the partition 53 is provided with an opening 61, which communicates with a passage 62, which in turn communicates with the annular passage 17, surrounding the cylinder. The opening 61 is closed by a valve 63 having a valve-stem 64 passing outwardly through a stuffing-box 65 and operated by a hand-wheel 66. This valve 63 regulates the discharge of water from the passage 61 to the annular passage 17, so that the rate of reciprocation of the piston is regulated to cause the sprinkler to move fast or slow across the lawn.

In the form shown in Fig. 3, instead of having the cylinder wholly supported by the foot 44, I provide the rear end of the cylinder 3 with an elongated rearwardly extending arm 67, having a curved lower end 68, which is adapted to rest upon the ground, whereby the weight of the cylinder is partly upon the arm, as shown in the drawings, and also serves as a rudder to guide the machine straight. A member 50' is loosely mounted upon the axle and adapted to swing downwardly and drag upon the ground to form a brake to prevent the rearward movement of the machine upon the forward stroke of the piston, whereby the drag of the shoe will move the machine, and thus preventing loss of motion in the travel of the machine. In Fig. 3, instead of having the nozzle in communication directly with the forward end of the passage 10, I provide the same with a turning plug or valve 69 having a screw-threaded portion 70, upon which the nozzle is screwed. This turning plug 69 regulates the discharge of water from the nozzle, as will be readily understood.

In the form shown in Fig. 5, I provide a reel 71, upon which the hose 72 is wound, and the reel may be made of any desired structure, but, preferably, of that shown. This frame 73 has the hose 72 connected therewith at 74 and the vertical portion of the frame at the center is provided with a connection 75 to which the spray-nozzle is connected and has a ball and socket connection, the same as Fig. 1, whereby the nozzle is set to throw the water in any direction. The frame 73 has the rearwardly extending arms 76, which are in communication with the frame 73, and through which the water passes. The said rearwardly extending arms 76 carry at the center a cylinder 77, which has a passage 78 along one side and which corresponds with the passage 10 of Fig. 1 of the drawing, and which is in communication with the arms 76. The cylinder 77 is constructed in precisely the same manner as that shown in Figs. 1 and 2, of the drawings, and provided with a piston rod 79 carrying the foot 80 and by which the cylinder and the arms 76 are supported. The operation of the cylinder, piston-rod and foot is the same as that in the embodiments shown in the other figures and is adapted to push the reel along the ground and at the same time unwind the hose therefrom as the sprinkler travels across the lawn.

Fig. 6 is a still further modified form showing the reel 80 mounted upon the frame formed of the forwardly extending pipes 82, which are provided at their front ends with a transverse pipe 83, upon which are mounted the wheels 84 for supporting the frame upon the ground. Secured to the frame is a bar 81 which serves as a handle for wheeling the machine around and also as a stand to set the reel up off the ground. The hose 85 is wound upon the reel connected to the hollow axle 86, which is in communication with the forwardly extending pipes 82. The transverse pipe 83 at the center is provided with a vertically disposed pipe 87, which communicates with the pipe 83 and through which passes the water from the hose, as clearly shown in the drawing. The upper end of the pipe 87 has the T-connection 88 to the upper end of which is connected a coupling 89, to which the spray-nozzle is attached. Connected to the T-connection 88 is a horizontally arranged pipe 90, which communicates with the passage 10 of the cylinder 3. This passage 10, as shown in Fig. 6, is in the side of the cylinder instead of the upper end. The cylinder 3 is constructed the same as that shown in Fig. 1, of the drawings and the piston rod 91 has pivotally connected thereto the foot 92 with the pitman 93'. The reel 80 is provided with a ring or flange 93, over which passes the friction clutch 94. Connected with this friction clutch 94 is the pitman 93'. This clutch, as shown is composed of two jaws 95 and 96, which are arranged one above and one below the ring or flange 93 carried by the reel. These jaws 95 and 96 are so arranged that they will not grip the ring 93, upon one movement of the pitman 93', but upon the other movement of the pitman the jaws grip the ring and move or rotate the ring a short distance, thus rotating the reel 80 and causing it to travel across the lawns.

The structure shown in Fig. 6 is more especially designed for large sprinklers used on large lawns where a large amount of hose is required and thus avoiding the necessity of dragging a long length of hose across the lawn. Where a large amount of hose is used, the water pressure would not be sufficient to drag the hose and yet would have power enough to cause the reel to move and carry the hose wound thereon.

In order that the sprinkler will not stop when it reaches the end of the hose, as is the case in the form shown in Figs. 1, 2, 3, 4, and 5, I mount the shoe 44 as shown in Fig. 16 upon a vertical pivot 54', carried by the yoke 53', which in turn is carried by the piston rod 9. This shoe 44, as shown, is riveted upon the plate 52', which in reality is mounted upon the vertical bolt 54'. The plate 52' is provided with a sleeve 56', which has its upper end bearing upon the arm of the yoke 53'. Surrounding the said sleeve is a coiled spring 57', which has its lower end 58', securely fastened in the plate 52', and its upper end 59' entering an opening 60' in the yoke. The shoe 44 as shown in Fig. 16 of the drawing is preferably made of spring metal and having a coil 44' therein for the purpose of giving it a certain amount of resiliency to allow it to pass over uneven ground without imparting too much of a shock to the cylinder through the piston. By this structure it will be seen that the spring normally holds the shoe 44 in a position in alinement with the piston rod 9, but allows the shoe to swing to either side when any undue pressure is brought to bear upon the piston rod.

Under normal conditions as long as the sprinkler is free to travel in a straight line, or in other words, until the machine has traveled the length of the hose, the shoe 44 is held in alinement with the piston rod or center line of the machine by means of the coiled spring, but when the sprinkler has traveled the full length of the hose, or as far as it is permitted to go, by limiting the length of the hose, then the pressure acting within the cylinder and still tending to force the machine on, causes the spring to yield, as shown in the various positions of Fig. 17, of the drawings. In this way the machine is caused to turn and travels sidewise to the previous direction of travel with the hose acting as a radius arm and holding the machine within its radius. Upon each inward stroke of the piston the spring causes the shoe 44 to assume a normal position with relation to the piston rod after which it again yields on each outward stroke of the piston, as above described, and causes the machine to turn. Thus the machine or sprinkler keeps kicking itself around until it is again free to travel back or off to one side in a straight line owing to the further lack of resistance of the hose.

In Figs. 12 and 13, instead of using the yoke 37, I provide a shaft 97, upon which the coiled spring 98 is wound and extended downwardly into the loop 99. This spring is also coiled upon the bolt 100 and an additional spring 101 is used to further aid in holding the bolt in an outward position to engage the end of the piston 31. The operation of this device is precisely the same as that shown in the other figures.

The cylinder housing 3 has a pin 105 driven therein and which extends beyond the same and passes through the groove 106 in the nut 42 carried by the valve 24, as clearly shown in Figs. 10 and 11. This allows the valve to freely reciprocate but prevents its rotation.

Having thus described my invention, what I claim and desire to secure by Letters Patent is—

1. A sprinkler of the character described, comprising a support, a cylinder carried by the support, a hose connection for one end of the cylinder, a discharge for the other end of the cylinder, and means operated by the water pressure in the cylinder from the hose connection for intermittently moving said support.

2. A sprinkler of the character described comprising a support, a cylinder carried by the support, a supply and discharge carried by the opposite ends of the cylinder, a piston within the cylinder, a water supply for the inlet end of the cylinder for moving said piston, and means operated by the piston for engaging the ground and intermittently moving said support.

3. A sprinkler of the character described, comprising a support, a cylinder carried by the support, said cylinder having an inlet and outlet at opposite ends, a piston within the cylinder, a water supply for the inlet opening for moving the piston within the cylinder, a piston rod carried by the piston and a shoe carried by the piston rod for engaging the ground for intermittently moving the support, substantially as shown and described.

4. A sprinkler of the character described, comprising a support, a cylinder carried by the support, a hose connection for one end of the cylinder and a discharge at the opposite end, a piston within the cylinder and operated by the water-pressure from the hose connection, a piston rod carried by the piston and extending out through the rear end of the cylinder and adapted to engage the ground for moving the said support forward during the rearward movement of the piston.

5. A sprinkler of the character described, comprising a support, a cylinder carried by the support, a hose connection for one end of the cylinder and a discharge for the opposite end, a reciprocating piston within the cylinder and operated by the water pressure from the hose connection, a piston rod carried by the piston and extending through the rear end of the cylinder, and a foot carried by the piston-rod and adapted to engage the ground for moving the support forward on the rearward stroke of the piston.

6. A sprinkler of the character described, comprising a support, a cylinder carried by the support and having a water passage at its upper end, a hose connection for the rear end of the said passage, a water discharge at the forward end of the passage, said cylinder having water communication with the said passage, a piston within the cylinder and operated by the water-pressure from the water passage, a piston rod carried by the piston and extending outwardly through the rear end of the cylinder and adapted to engage the ground for moving the support forward during the rearward stroke of the piston.

7. A sprinkler of the character described, comprising a cylinder having a water-passage at its upper end, a hose connection for the rear end of the passage, a water discharge for the forward end of the passage, the said cylinder having communication with the said water-passage, an automatic valve for controlling the supply of water to the opposite ends of the cylinder, a piston within the cylinder, a piston rod carried by the piston and extending outwardly through the rear end of the cylinder, and adapted to engage the ground, whereby the support is moved forward upon the rear stroke of the piston.

8. A sprinkler of the character described, comprising a support, a cylinder carried by the support, a water-passage at the upper end of the cylinder, a hose connection for the rear end of the passage and a water discharge for the forward end of the passage, said passage having communication with the cylinder, a valve controlling the communication between the chamber and the cylinder, an automatic valve for supplying water to first one end of the cylinder and then the other, a piston within the cylinder and operated by the water pressure from the passage, a piston-rod carried by the piston and extending outwardly through the rear end of the cylinder and adapted to move the support on one stroke thereof.

9. A sprinkler of the character described, comprising a support, a cylinder carried thereby, a water passage above the cylinder, a hose connection for the rear end of the passage, a water-discharge for the forward end of the passage, said cylinder having communication with the said passage, a valve controlling the communication with the passage and the cylinder, a valve controlling the discharge of the passage, a piston within the cylinder, a valve operated by the movement of the piston for allowing the water to pass to first one end of the cylinder and then the other, a piston within the cylinder and means operated by the piston for moving said support.

10. A sprinkler of the character described, comprising a support, a cylinder carried thereby, a water passage adjacent the cylinder, a hose connection for one end of the passage, a discharge for the opposite end of the passage, said cylinder having a communication with the said passage, a valve controlling said communication, a valve controlling the discharge of the passage, a sliding valve controlling the water supply from the passage to the ends of the cylinder, a piston within the cylinder and operated by the water pressure within the cylinder, for reciprocating the piston, and means operated by the piston for intermittently moving said support.

11. A sprinkler of the character described comprising a support, a cylinder pivotally carried by the forward end of the support, a hose connection for the cylinder, a piston within the cylinder and operated by a small portion of the water from the hose connection, and means carried by the piston for supporting the rear end of the cylinder and intermittently moving the support forward.

12. A sprinkler of the character described, comprising a support, a cylinder pivotally supported at its forward end to said support, a piston within the cylinder, a piston-rod carried by the piston and extending outwardly through the rear end of the cylinder and engaging the ground for supporting the rear end of the cylinder, a hose connection for the cylinder, and said cylinder adapted to receive a small portion of the water from the hose connection for reciprocating the piston whereby the support is intermittently moved forward.

13. A sprinkler of the character described, comprising a support, a cylinder carried by the support, a water passage adjacent the cylinder, a hose connection for one end of the passage and a discharge for the opposite end of the passage, said cylinder having communication with the passage, a reciprocating piston within the cylinder and operated by the water pressure from the passage, means operated by the piston for intermittently moving said support, a sliding valve operated by the piston for allowing the water to pass first to one end of the cylinder and then to the opposite end, substantially as shown and described.

14. A sprinkler of the character described, comprising a support, a cylinder carried by the support, the upper face of the cylinder having a longitudinal water-passage, a hose connection for one end of said passage, a nozzle carried by the opposite end of the passage, an annular chamber formed on the cylinder and in communication with the said water passage, a sliding tubular valve in communication with the cylinder and controlling the water to the opposite ends of the cylinder, a piston within the cylinder, means operated by the movement of the piston for operating said valve and means carried by the piston for intermittently moving said support.

15. A sprinkler of the character described comprising a support, a cylinder carried by the support, the upper face of the cylinder having a longitudinal water passage, a hose connection for one end of the passage, a nozzle carried by the opposite end of the passage, an annular passage on the outside of the cylinder and in communication with the water passage, a sliding hollow valve extending longitudinally with the cylinder and in communication with opposite ends of the cylinder, a partition in said cylindrical valve and adapted to control the water-passage from the annular passage to the opposite ends of the cylinder, and an exhaust port adapted to discharge the water from the ends of the cylinder, a piston within the cylinder, means operated by the piston for operating said cylindrical valve, and means operated by the piston for intermittently moving the said support.

16. A sprinkler of the character described, comprising a support, a cylinder carried by the support, a hose connection with the cylinder, a spray-nozzle carried by the cylinder, a piston within the cylinder and operated by the water pressure from the hose connection, a sliding valve controlling the water to the opposite ends of the piston, intermediately pivoted members carried by the ends of the cylinder and operated by the piston for moving the valve, and a piston rod carried by the piston and adapted to engage the ground for moving the support forward during the rearward movement of the piston.

17. A sprinkler of the character described, comprising a support, a cylinder carried by the support, a hose connection for the cylinder, a spray-nozzle at the opposite end of the cylinder, a piston within the cylinder and operated by the pressure of a small portion of the water of the hose connection, a sliding valve controlling the water to the ends of the cylinder, intermediately pivoted members carried by the ends of the cylinder and operating the valve and operated by the piston, and means carried by the piston for intermittently moving the said support.

18. A sprinkler of the character described, comprising a support, a cylinder carried by the support and having a water passage along one side, a hose connection for one end of the passage, a discharge at the opposite end of the passage, said cylinder in communication with the said passage, a sliding valve controlling the communication between the passage and cylinder, intermediately pivoted members carried by the ends of the cylinder and operating the valve and operated by engagement with the piston whereby the water is at first admitted to one end of the cylinder and simultaneously exhausted from the opposite end and vice versa, and means carried by the piston for intermittently moving the support.

19. A sprinkler of the character described, comprising a pair of wheels, a cylinder pivotally supported between the wheels, a hose connection for the cylinder, a spray-nozzle at the opposite end of the cylinder, a piston within the cylinder and operated by the water-pressure from the hose connection, an arm carried by the rear end of the cylinder and engaging the ground for supporting and guiding the same, and means carried by the piston for engaging the ground and forcing the cylinder and its wheels forward during the rearward stroke of the piston.

20. A sprinkler of the character described, comprising a pair of wheels, a cylinder pivotally supported between the wheels, a hose connection for one end of the cylinder, a spray nozzle at the opposite end of the cylinder, an arm carried by the rear end of the cylinder and engaging the ground for supporting and guiding the same, a piston within the cylinder and operated by a small portion of the water from the hose connection, a piston rod carried by the piston and extending out through the rear end of the cylinder, and a foot carried by the piston and adapted to engage the ground, whereby the wheels and cylinder are moved during the rearward stroke of the piston.

21. A sprinkler of the character described, comprising a support, a hose connection carried by the support, means operated by the water-pressure from the hose connection for intermittently moving said support, and automatic means for changing the direction of movement of the support.

22. A sprinkler of the character described comprising a support, a cylinder carried by the support, a hose connection for the cylinder, a piston within the cylinder and operated by the water pressure from the hose connection, a piston rod carried by the piston and extending out through the rear end of the cylinder, and means carried by the piston rod for engaging the ground for moving the support forward.

23. A sprinkler of the character described, comprising a support, a cylinder carried by the support, a hose connection for one end of the cylinder, a piston within the cylinder and operated by the water-pressure from the hose connection, a piston rod carried by the piston and extending out through the rear end of the cylinder and a pivoted foot carried by the piston rod and adapted to engage the ground for moving the support forward and adapted to cause the support to travel to one side by the tension of the hose when the end thereof has been reached, substantially as shown and described.

24. A sprinkler of the character described, comprising a support, a cylinder carried by the support, a hose connection for one end of the cylinder and a discharge at the opposite end, a piston within the cylinder and operated by the water-pressure from the hose connection, a piston rod carried by the piston and extending out through the rear end of the cylinder, and a pivoted spring-held foot carried by the piston rod and adapted to engage the ground for the purpose described.

25. A sprinkler of the character described, comprising a support, a cylinder carried by the support, a hose connection for one end of the cylinder and a discharge at the opposite end, a piston within the cylinder and operated by the water-pressure from the hose connection, a piston rod carried by the piston and extending out through the rear end of the cylinder, and a pivoted spring-held foot carried by the piston and adapted to engage the ground for moving the support forward and changing the direction of movement thereof by the tension of the hose when the end thereof has been reached.

26. A sprinkler of the character described, comprising a support, a hose connection carried by the support, a reciprocating kicker carried by the support and constructed and arranged to move the support forward and automatically change its direction of movement by the tension of the hose when the end thereof has been reached.

27. A sprinkler of the character described comprising a support, a cylinder carried by the support, a hose connection for one end of the cylinder and a discharge at the opposite end, a piston within the cylinder and operated by the water-pressure from the hose connection, a piston rod carried by the piston and extending outwardly through the rear end of the cylinder, a yoke carried by the piston rod, a vertical pivot carried by the yoke, a foot mounted upon the pivot of the yoke, a spring normally holding the foot in alinement with the piston rod, whereby undue pressure on the support will cause the foot to move to one side and change the direction of movement of the support.

28. A sprinkler of the character described, comprising a support, a cylinder carried by the support, a hose connection for one end of the cylinder, a spray nozzle having a ball and socket connection with the opposite end of the cylinder, a piston within the cylinder and operated by the pressure from the hose connection, and a piston rod carried by the piston and extending out through the rear end of the cylinder and adapted to engage the ground for moving the said support forward during the rearward movement of the piston.

29. A sprinkler of the character described, comprising a support, a hose connection carried by the support, means operated by the water-pressure from the hose connection for moving the support forward, and means for preventing the rearward movement of said support.

30. A sprinkler of the character described, comprising a support, a hose connection carried by the support, means operated by the water-pressure from the hose connection for moving said support forward and a pivoted brake carried by the support for preventing the backward movement of the support.

31. A sprinkler of the character described, comprising a support, a cylinder carried thereby, a piston within the cylinder, a hose connection for the cylinder, a discharge for the cylinder, means operated by the water-pressure within the cylinder for moving said support forward and a pivoted brake carried by the support and adapted to prevent the rearward movement of the support during the forward movement of the piston.

32. A sprinkler of the character described, comprising a support, a cylinder pivotally carried by the support at its forward end, a hose connection for the cylinder, a piston within the cylinder and operated by a small portion of the water from the hose connection, means carried by the piston for supporting the rear end of the cylinder and intermittently moving the support forward, and a pivoted brake carried by the support adjacent the pivotal connection of the cylinder with the support and adapted to prevent the backward movement of the support during the forward movement of the piston.

In testimony whereof I hereunto affix my signature in the presence of two witnesses.

GEORGE CHARLES BOHNENKEMPER.

Witnesses:
A. R. CLIFF,
O. W. SEYFFERT.